Oct. 20, 1964     V. E. SWANSON     3,153,475
ARCUATE CONVEYOR
Filed Oct. 29, 1962

INVENTOR.
Victor E. Swanson
BY
Olson, Mecklenburger, von Holst,
Pendleton & Neuman Attys

1

3,153,475
ARCUATE CONVEYOR
Victor E. Swanson, Fort Atkinson, Wis., assignor, by mesne assignments, to St. Regis Paper Company, New York, N.Y., a corporation of New York
Filed Oct. 29, 1962, Ser. No. 233,734
9 Claims. (Cl. 198—182)

This invention relates to an arcuate conveyor utilized for conveying lightweight items which may or may not be packaged (e.g. wrapped butter, packaged frozen foods, cartons of screws, bolts or nails, etc.). The arcuate conveyor in question is intended primarily for use in combination with additional conveying means. In arcuate conveyors utilizing wide endless belts, the problem of obtaining and maintaining the upper section or surface of the belt in a planar wrinkle-free condition during operation of the conveyor has always been difficult to overcome. Prior efforts in resolving such a problem have necessitated the adoption of mechanical structures requiring belts and other components which are of custom, costly, and complex design. By reason of these facts, therefore, the maintenance, servicing and installation of such prior structures have become difficult and time consuming operations.

Thus, it is one of the objects of this invention to provide an arcuate conveyor which can be readily installed and used with conventional tandem conveyor systems; the latter being disposed at the same or different elevations.

It is a further object of this invention to provide an arcuate conveyor which can readily accomplish a complete reversal or change in the direction of movement of the items or products being conveyed thereby without causing disorder to such items.

Another object of this invention is to provide a simple and inexpensive arcuate conveyor which is capable of maintaining the supporting or load bearing surface thereof in a flat wrinkle-free condition during angular movement thereof without requiring inner and outer peripheral tension means.

A further object of this invention is to provide an arcuate conveyor which is formed of relatively few parts many of which are of conventional design and construction.

Further and additional objects will appear from the description, accompanying drawings and appended claims.

In accordance with one embodiment of this invention, an arcuate conveyor is provided which is adapted for use in a cold room wherein delay time is needed to refrigerate the items or products being conveyed therethrough. The arcuate conveyor in this instance is utilized in combination with straight line conveyors and is adapted to receive the product discharged from one of said line conveyors, move such product through an arc of approximately 180° and deposit such product onto a second of such line conveyors. The speed with which the straight line and arcuate conveyors operate will depend upon the temperature at which the cold room is maintained, the size of such cold room, and hardening characteristics of the products involved in order to produce the condition of the end product desired.

The arcuate conveyor in the one embodiment is disposed at the corresponding ends of two straight line conveyors which are arranged in spaced parallel relation. The arcuate conveyor includes a wide endless belt means which has a planar sector-shaped upper section upon which the products to be conveyed are deposited by one of the straight line conveyors and from which the products are discharged onto the second straight line conveyor. A pair of elongated support rollers are provided which are adapted to engage the infeed and discharge sides of the belt upper section. Each support roller is adapted to rotate about its longitudinal axis. The support roller, which engages the discharge side of the belt upper section, is provided with a pair of longitudinally spaced raised peripheral segments that engage the arcuate marginal portions of the sector-shape belt upper section. Disposed intermediate these raised peripheral segments and longitudinally spaced with respect thereto is a third raised peripheral portion which is adapted to frictionally engage the belt upper section and drive same in one direction. A fixed planar support is provided which subtends substantially the whole of the belt upper section and over which such upper section is adapted to readily slide.

For a more complete understanding of this invention reference should be made to the drawing wherein.

Figure 1:
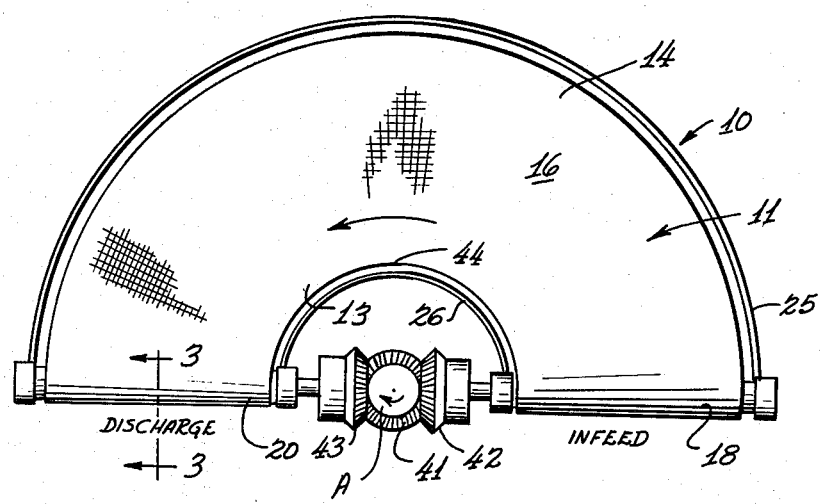
FIG. 1 is a fragmentary top plan view of one embodiment of the improved arcuate conveyor.

Referring now to the drawing and more particularly to FIG. 1, an arcuate conveyor 10, sometimes referred to as a belt turn, is shown which in this instance is adapted for use with a pair of straight line conveyors, not shown, which are disposed in substantially parallel spaced relation with respect to one another. The conveyor 10 in this instance effects a 180° change in the direction of movement of the product; however, as will be hereinafter discussed, the invention is not intended to be limited to this precise construction as illustrated. For purposes of facilitating understanding of the invention, the invention hereinafter will be described in relation to an apparatus having a 180° turn.

Figure 6:
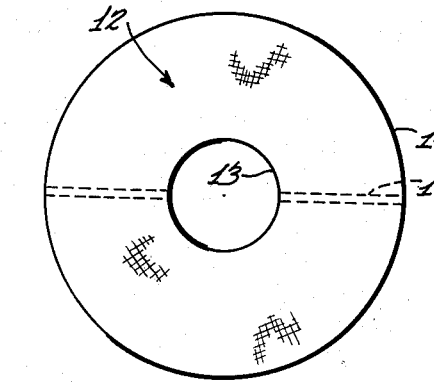
FIG. 6 is a plan view of the blank from which the endless belt is formed.

Conveyor 10 includes a wide endless belt 11 which as shown in FIG. 6 is formed from a blank 12 which is of ring-like configuration and is preferably formed of a rubberized fabric which retains its pliable characteristics notwithstanding that the belt constructed therefrom might be subjected to a wide range of temperatures. The center of the blank has an opening delimited by marginal portion 13. The outer peripheral or marginal portion 14 of the blank is circular and is disposed in a concentric relation with the inner marginal portion 13. Blank 12 is folded about a diametrically disposed fold line 15 so as to form a sector-shaped upper section 16 and a sector-shaped lower section 17, see FIGS. 1 and 3. In FIG. 1, it will be noted that the ends of upper and lower sections 16 and 17 are interconnected by a substantially semi-cylindrical end section 18 which is disposed at the INFEED side of the conveyor. Likewise, the other end limits of the upper and lower sections are interconnected by a similarly-shaped end section 20 which is disposed at the DISCHARGE side of the conveyor.

Figure 2:
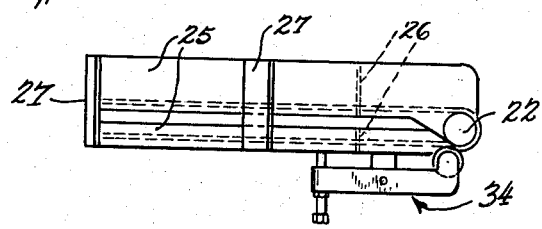
FIG. 2 is a fragmentary left side elevational view of FIG. 1.
Figure 5:
FIG. 5 is similar to FIG. 4 but showing the support roller disposed adjacent the infeed end of the conveyor.

Coacting with end section 18 is an elongated support roller 21, see FIG. 5. In a similar manner belt end section 20 coacts with a second elongated support roller 22, see FIG. 4. To support the belt upper and lower sections 16 and 17, there is provided planar support surfaces 23 and 24, see FIG. 3, which are of substantially the same sector-shape as belt sections 16 and 17, and thus substantially span the arcuate distance between support rollers 21 and 22. Extending upwardly from the outer arcuate periphery of planar supports 23 and 24 are flanges 25, see FIG. 2, each being spaced from but conforming substantially to the configuration of outer marginal portion 14 of the belt. Planar supports 23 and 24 are likewise provided with upwardly extending flanges 26 which are disposed adjacent to, but spaced from, the inner arcuate periphery 13 of the belt. Flanges 25 and 26 serve to guide the product as it is being moved by the belt upper section 16 from the INFEED station to the DISCHARGE station. In addition to serving as guides, the flanges 25 and 26 afford protection for the marginal portions of the belt from damage and act to reinforce the peripheries of the planar supports. In order to maintain planar supports 23 and 24 in proper spaced parallel relation, a plurality of brackets 27 are provided, see FIG. 2.

Figure 3:
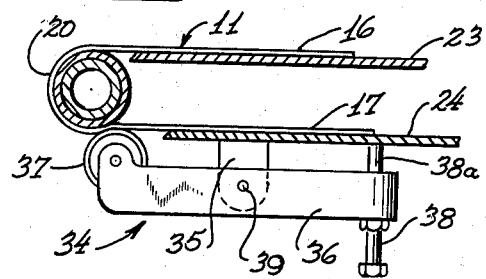
FIG. 3 is an enlarged fragmentary sectional view taken along line 3—3 of FIG. 1.
Figure 4:
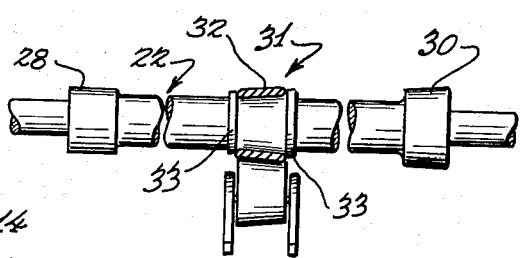
FIG. 4 is an enlarged fragmentary front elevational view of the support roller disposed adjacent the discharge end of the conveyor shown in FIG. 1.

Support roller 22, as shown more clearly in FIG. 4, is provided with a pair of raised peripheral segments 28 and 30 which are longitudinally spaced with respect to one another and effect line contact between the inner and outer marginal portions of end section 20 of the belt. It will be noted in FIG. 4 that end segment 30, which is disposed at a greater distance from the center of curvature A of the conveyor has a greater diameter than the other segment 28 so as to compensate for the speed differential between the inner and outer marginal portions of the belt. Disposed on support roller 22 and located intermediate segments 28 and 30 and substantially equidistant therefrom is an intermediate raised segment 31. Segment 31 in the illustrated embodiment includes a bushing member 32 formed of a rubber-like material having a high coefficient of friction which is partially encompassed by belt end section 20, see FIG. 3. To maintain proper axial positioning of the member 32 on roller support 22, a pair of longitudinally spaced retaining collars 33 are provided. The axial dimension of member 32 is narrow and provides the principal driving contact between belt 11 and the roller supports 21 and 22. End segment 30 and bushing member 32 have the peripheries thereof tapered with the smaller ends thereof adjacent the center of curvature A of the apparatus. The larger end of the member 32 is of a slightly smaller diameter than the smaller end of segment 30. Thus, the tapered peripheries of segment 30 and member 32 compensate for the speed differential between the center and outer portions of this belt.

To be assured of proper frictional engagement between intermediate segment 31 and the belt end section 20, a tightening assembly 34 is provided, see FIG. 3. Assembly 34 includes a bracket 35 which depends from the underside of the lower planar support 24 and is located in close proximity to the discharge end of conveyor 10. Pivotally connected to the lower distal end of bracket 35 is a transversely extending elongated arm 36 to one end of which is rotatably mounted a roller 37. The pivot point 39 of arm 36 is substantially at the mid-point thereof. Roller 37 is adapted to engage the belt 11 at approximately the juncture of end section 20 with lower section 17. It will be noted in FIG. 4 that the taper of roller 37 is opposite that of bushing member 32. The belt is, therefore, sandwiched between segment 31 and roller 37. To effect greater or less force to be imparted to the belt, an adjusting screw-like element 38 is mounted at the opposite end of arm 36 from that to which the roller 37 is mounted, see FIG. 3. The threaded adjustment has the end 38a thereof contacting the underside of fixed planar support 24.

In FIG. 5 is illustrated an embodiment of support roller 21. In this instance a single raised peripheral segment 40 is formed thereon at the end of the roller which is closest to the center of curvature A. This segment 40, if of a frusto-conical shape, is adapted to engage in line contact the inner marginal portion 13 of the belt. However, point contact obtained by a cylindrical shape of segment 40, FIG. 5, is operative as well to relieve tension and wrinkling in the belt normally caused by the pull of roller 22 between point 44, FIG. 1, near or about mid center of the belt and the contact of the segment 40.

It will be noted in both the roller supports 21 and 22 that the inner and outer marginal portions of the belt merely effect line contact with such roller supports and no chain or other tensioning means is employed to cause the upper section 16 of the belt to remain in a flat wrinkle-free condition while the belt is being driven. If greater driving force is required than that provided by intermediate segment 31 on support roller 22, a second intermediate segment may be provided which is longitudinally spaced with respect to the first intermediate segment and the end segments.

When it is desirous of effecting a turn of less than 180°, apparatus is modified so as to use a belt formed from blank defining a frustum of a cone in a manner well known in the art and is illustrated in the Fry Patent No. 3,044,603. Where such a belt is employed the shape of the planar supporting surfaces 23 and 24 and the angular relative disposition of the support rollers 21 and 22 must be changed so as to conform to the shape of the belt once it is folded.

In order that the upper section 16 of the belt 11 remains in a planar condition, the longitudinal axes of the support rollers 21 and 22 may be disposed, although not essential, slightly out of the horizontal plane so that the point of initial contact between the belt end sections and the roller raised peripheral segments will lie in the plane of the upper fixed surface support 23 as shown more clearly in FIG. 3. In the embodiment shown in FIG. 1, both support rollers 21 and 22 are driven by a bevel gear 41 which is driven in one direction by suitable means and engages a pair of diametrically opposed bevel gears 42 and 43, which in turn are keyed to stubs formed on the inner ends of support rollers 21 and 22, respectively. Other means well known in the art may be utilized for effecting rotation of rollers 21 and 22.

Thus, it will be seen that an arcuate conveyor has been provided which is extremely simple in construction and yet is capable of accommodating and transferring a plurality of lightweight products without disorder. The improved arcuate conveyor may be readily installed in existing straight line conveyor systems. In addition the improved arcuate conveyor incorporates numerous components which are of conventional design and construction which materially reduce the cost of the conveyor.

While a particular embodiment of this invention has been shown above, it will be understood of course that the invention is not to be limited thereto, since many modifications may be made by those skilled in this art in light of the disclosure herein. It is contemplated, therefore, by the appended claims to cover any such modifications as fall within the true spirit and scope of this invention.

I claim:
1. An arcuate conveyor operable between arcuately spaced infeed and discharge stations, comprising a substantially non-stretchable endless belt means having a planar sector-shaped upper section for substantially spanning the arcuate distance between such stations, a lower section disposed beneath said upper secton, and substantially semi-cylindrical end sections interconnecting the corresponding end limits of said upper and lower sections; a pair of elongated support means, each mounted for rotation about its longitudinal axis, the first of said pair of support means being positionable adjacent such infeed station and engaging one of said end sections, the second of said pair of support means being positionable adjacent such discharge station and engaging the second of said end sections, both of said support means being power driven, said second support means having a pair of longitudinally spaced raised peripheral first guide segments engaging the marginal portions of said second end section and a raised peripheral second segment intermediate and longitudinally spaced from said first segments, said second segment frictionally engaging said second end section and effecting movement of said belt means upper section in a direction from the infeed to the dis- charge stations, said belt means being maintained in a substantially taut condition when said arcuate conveyor is in operation; and a fixed planar third support means subtending and being slidably engaged by said belt means upper section.

2. The arcuate conveyor recited in claim 1 wherein the first of said pair of support means is provided with a raised peripheral guide segment which engages the marginal portion of said one end section disposed closest to the center of curvature of said arcuate conveyor to cause said belt means to track along a predetermined path.

3. The arcuate conveyor recited in claim 1 wherein said belt means lower section is subtended by and slidably engages a fixed planar fourth support means.

4. The arcuate conveyor recited in claim 3 wherein said third and fourth support means are disposed in spaced substantially parallel relation and both span substantially the arcuate distance between said pair of first support means.

5. The arcuate conveyor recited in claim 1 wherein the lines of contact between the raised peripheral segments of the second support means and the belt means second end section cooperate to define substantially a frustum of a cone with the small end of such frustum being closest to the center of curvature of the arcuate conveyor.

6. The arcuate conveyor recited in claim 1 including belt tightening means adjustably mounted adjacent the intermediate peripheral segment of said second support means and in engagement with the belt means contacting said second support means.

7. An arcuate conveyor operable between arcuately spaced infeed and discharge stations, comprising a substantially non-stretchable endless belt means having a planar sector-shaped upper section for substantially spanning the arcuate distance between such stations, a planar sector-shaped lower section disposed in spaced substantially parallel relation with respect to said upper section, and substantially semi-cylindrical end sections interconnecting the corresponding end limits of said upper and lower sections; a pair of elongated support means, each mounted for rotation about its longitudinal axis, the first of said pair of support means being power driven and positionable adjacent such infeed station and provided with a raised peripheral segment having a surface configuration engaging the marginal portion of said one end section disposed closest to the center of curvature of said arcuate conveyor, the second of said pair of support means being power driven and positionable adjacent such discharge station and provided with a pair of longitudinally spaced raised peripheral first segments engaging the marginal portions of said second end section and a raised narrow peripheral second segment disposed substantially equidistant from said first segments, said second segment frictionally engaging and being partially encompassed by said second end section and effecting movement of said belt means upper section in a direction from the infeed to the discharge stations; a fixed planar third support means subtending and being slidably engaged by substantially the whole of said belt means upper section; a fixed planar fourth support means subtending and being slidably engaged by substantially the whole of said belt means lower section; adjustable means to maintain said belt means in a substantially taut condition when said arcuate conveyor is moving; and a guide extending upwardly from said planar third support and being adjacent to but spaced from the outer marginal portion of said belt means upper section and conforming substantially to the curvature of said marginal portion.

8. An arcuate conveyor comprising an endless belt means of substantially constant dimension having a planar sector-shaped upper section provided with an infeed side and a discharge side; a pair of elongated support means, each mounted for rotation about its longitudinal axis, one of said pair of support means being power driven and engaging the infeed side of said upper section and the second of said pair of support means being power driven and engaging the discharge side of said upper section to effect movement of said upper section from said infeed to said discharge sides; and a fixed planar support surface subtending and being slidably engaged by substantially the whole of said upper section; said second support means having the periphery thereof provided with a pair of longitudinally spaced raised first and second segments which contact only the opposite arcuate marginal portions of said upper section at the discharge side thereof, and a third raised segment disposed intermediate and in longitudinally spaced relation with respect to said first and second segments and frictionally engaging said upper section.

9. The arcuate conveyor recited in claim 8 and including means cooperating with said second support means to effect tightening of said endless belt means until a substantially taut condition is reached.

References Cited in the file of this patent
UNITED STATES PATENTS

| | | |
|---|---|---|
| 2,253,913 | Paterson | Aug. 26, 1941 |
| 2,413,339 | Stadelman | Dec. 31, 1946 |
| 2,990,052 | Stille | June 27, 1961 |
| 3,042,989 | Foley | July 10, 1962 |
| 3,044,603 | Fry | July 17, 1962 |